United States Patent
Lin

(10) Patent No.: US 7,538,452 B2
(45) Date of Patent: May 26, 2009

(54) POWER-SAVING CIRCUIT AND METHOD THEREOF

(75) Inventor: Mark Lin, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/808,618

(22) Filed: Jun. 12, 2007

(65) Prior Publication Data

US 2008/0309167 A1  Dec. 18, 2008

(51) Int. Cl.
*H02J 1/00* (2006.01)

(52) U.S. Cl. .................. 307/85; 713/300; 700/12

(58) Field of Classification Search ........... 307/112, 307/85; 700/11, 12; 713/300, 320
See application file for complete search history.

(56) References Cited

U.S. PATENT DOCUMENTS

| | | | | |
|---|---|---|---|---|
| 5,867,007 | A * | 2/1999 | Kim | 320/118 |
| 6,463,545 | B1 * | 10/2002 | Fisher et al. | 713/340 |
| 6,760,850 | B1 * | 7/2004 | Atkinson et al. | 713/320 |
| 7,243,246 | B2 * | 7/2007 | Allen et al. | 713/300 |
| 2004/0113496 | A1 * | 6/2004 | Nguyen | 307/66 |
| 2005/0091546 | A1 * | 4/2005 | Tsai | 713/300 |
| 2005/0204070 | A1 * | 9/2005 | Shaver et al. | 710/8 |
| 2006/0129857 | A1 * | 6/2006 | Liu et al. | 713/320 |
| 2006/0145538 | A1 * | 7/2006 | Proefrock et al. | 307/18 |
| 2007/0150766 | A1 * | 6/2007 | Kuwahara | 713/300 |
| 2007/0171606 | A1 * | 7/2007 | Iwai | 361/685 |
| 2007/0186122 | A1 * | 8/2007 | Hori et al. | 713/320 |
| 2007/0222297 | A1 * | 9/2007 | Hung | 307/66 |
| 2008/0104437 | A1 * | 5/2008 | Lee | 713/323 |
| 2008/0148082 | A1 * | 6/2008 | Shen et al. | 713/320 |
| 2008/0195874 | A1 * | 8/2008 | Zhou | 713/320 |

\* cited by examiner

*Primary Examiner*—Albert W Paladini
*Assistant Examiner*—Daniel Cavallari
(74) *Attorney, Agent, or Firm*—Bacon & Thomas, PLLC

(57) ABSTRACT

The present invention discloses a power-saving circuit applied in a portable electronic device, which includes a voltage input module for outputting a first enable signal after receiving an external voltage, a power switch for being operated by a user to output a second enable signal and a start signal, a switching module electrically coupled to the voltage input module and the power switch for selectively receiving the first and second enable signals to determine whether or not to turn off the switching module, and a voltage conversion module electrically coupled to the switching module for receiving one of the external voltage and a battery voltage from the voltage input module when the switching module is closed. Thus, the battery voltage cannot be sent to the portable electronic device when the switching module is opened.

11 Claims, 3 Drawing Sheets

POWER-SAVING CIRCUIT AND METHOD THEREOF

FIELD OF THE INVENTION

The present invention relates to power-saving circuits, and more particularly to a power-saving circuit and a method applied in a portable electronic device having a switching module for selectively conducting a voltage input module and a voltage conversion module.

BACKGROUND OF THE INVENTION

For a conventional portable electronic device, if it is desired to be used at anytime and anywhere, it will need to consume the power of a battery installed in the portable electronic device. When the power becomes insufficient, other external power sources are needed. However, when the consumer uses the conventional portable electronic device, especially the notebook computer, a frequently encountered problem is that the battery of the notebook computer is exhausted, and the notebook computer needs to connect to other external power source or replace the battery with a new one. This not only causes trouble to the user, but also reduces the convenience in using the notebook computer.

After some manufacturers carefully researched the reasons that contribute to the power insufficiency, it has been found that one major reason is when the notebook computer is powered off, the battery of the notebook computer still supplies power to logic circuits located in the notebook computer, for example, a South Bridge chip, a keyboard controller (KBC) and the like, such that the notebook computer still consumes approximately 100 to 150 mW of power when it is powered off. Furthermore, if voltage of I/O pins located in the notebook computer is not set at correct level, the power consumption will be higher, which will even cause electric leakage of IC. As such, even through the notebook computer is not used, the power will still be exhausted after a period of time, which not only wastes the power, but is also a nuisance the user often complained about.

SUMMARY OF THE INVENTION

In attempts to address the voltage consumption problem caused by the power consumption when the notebook computer is in the turn off state, a power-saving circuit and power-saving method is disclosed according to the present invention with low cost and simple structure to completely solve the aforementioned problem.

An object of the present invention is to provide a power-saving circuit that not only is readily applicable to the portable electronic device, but also has a low cost and can completely solve the problem caused by voltage consumption. The power-saving circuit comprises a voltage input module configured to selectively receive and output the external voltage and the battery voltage, and output a first enable signal after receiving the external voltage. The power-saving circuit further comprises a power switch, a switching module and a voltage conversion module. The power switch is configured to output a second enable signal and a start signal in response to an operation by a user. The switching module is electrically coupled to the voltage input module and the power switch, and configured to selectively receive the first and second enable signals to determine whether close the switching module. The voltage conversion module is electrically coupled to the switching module, and configured to receive one of the external voltage and the battery voltage from the voltage input module when the switching module is closed, such that after one of the external voltage and the battery voltage is converted, a working voltage is outputted to the portable electronic device.

Another object of the present invention is to provide a power-saving method applied to a portable electronic device allowing the portable electronic device in turn off state to greatly reduce its voltage consumption. The method is that: when a voltage input module of the portable electronic device receives a battery voltage, if the portable electronic device further receives a start signal, a switching module of the portable electronic device electrically connects the voltage input module to a voltage conversion module of the portable electronic device, and the conversion module converts the battery voltage into a working voltage and outputs the working voltage to the portable electronic device; if the switching module continuously receives a maintain signal, then the switching module continuously connects the voltage input module to the voltage conversion module; when the portable electronic device receives a close signal, and the switching module stops receiving the maintain signal, the switching module then disconnects the connection between the voltage input module and the voltage conversion module, thus greatly reducing the battery voltage consumption.

DETAILED DESCRIPTION OF THE PREFERRED EMBODIMENTS

Figure 1:
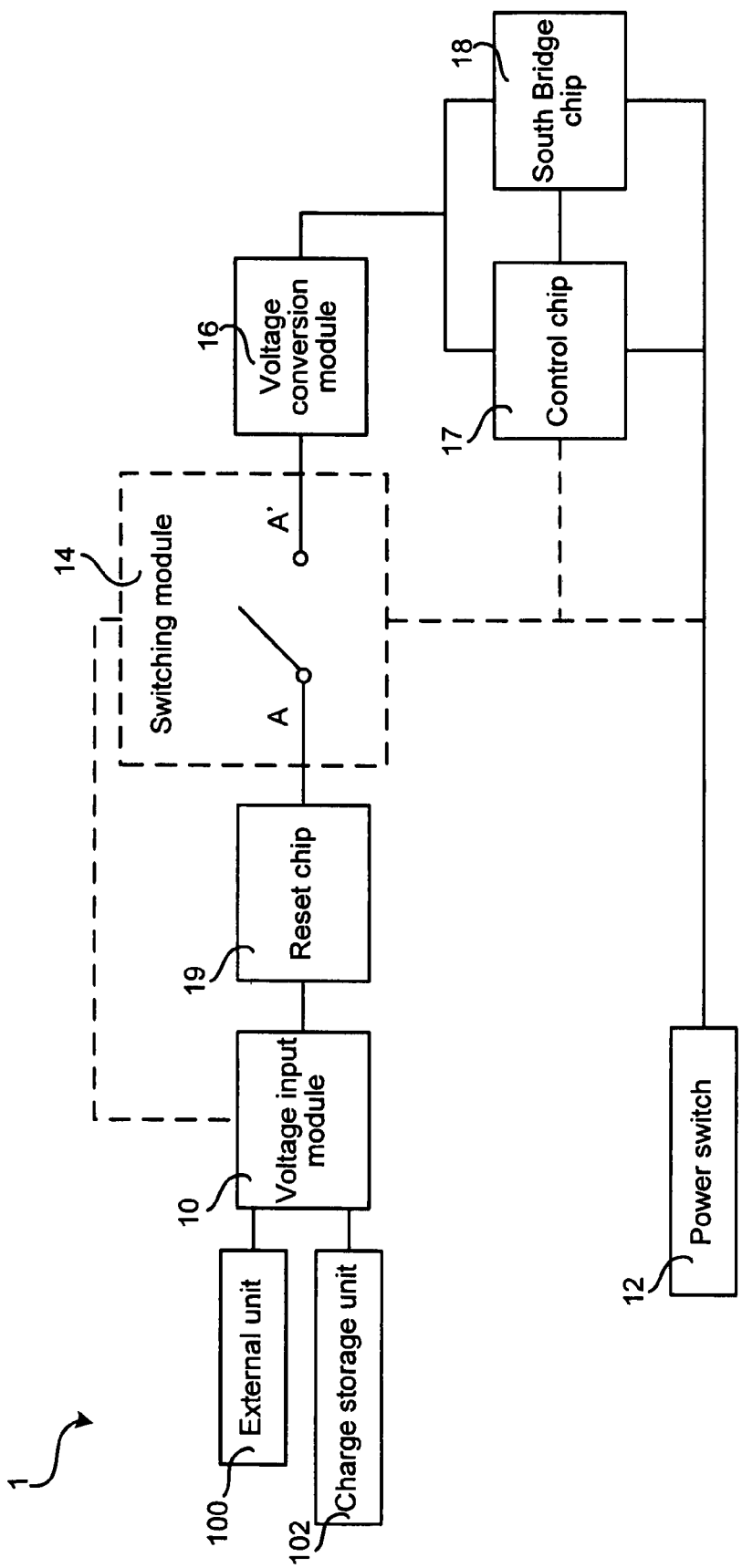
FIG. 1 is a circuit diagram in accordance with the present invention.

Referring to FIG. 1, the present invention discloses a power-saving circuit applied in a portable electronic device that selectively receives an external voltage (e.g. utility power) and a battery voltage. The power-saving circuit 1 includes a voltage input module 10, a power switch 12, a switching module 14, and a voltage conversion module 16. The voltage input module 10 is electrically coupled to an external unit 100 and a charge storage unit 102 to selectively receive and output the external voltage and the battery voltage, and output a first enable signal after receiving the external voltage. The power switch 12 outputs a second enable signal and a start signal according to a user's operation. The switching module 14 is electrically coupled to the voltage input module 10 and the power switch 12. The switching module 14 selectively receives the first and second enable signals to determine whether close the switching module 14 based on the first and second enable signals. The voltage conversion module 16 is electrically coupled to the switching module 14 for receiving one of the external voltage and the battery voltage from the voltage input module 10 when the switching module 14 is closed, such that after one of the external voltage and the battery voltage is converted, a working voltage is outputted.

As such, the voltage input module 10 outputs the first enable signal to the switching module 14 when the voltage input module 10 receives the external voltage, and the switching module 14 electrically connects the voltage input module 10 to the voltage conversion module 16, so that the external voltage is sent to the voltage conversion module 16 and converted into the working voltage. The voltage conversion module 16 then outputs the working voltage to the portable electronic device. When the voltage input module 10 receives the battery voltage, and the power switch 12 is operated (e.g., being pressed) to output the second enable signal to the switching module 14, the switching module 14 electrically connects the voltage input module 10 to the voltage conversion module 16, so that the battery voltage is sent to the voltage conversion module 16 for voltage conversion, and the voltage conversion module 16 then outputs the working voltage to the portable electronic device.

Figure 2:
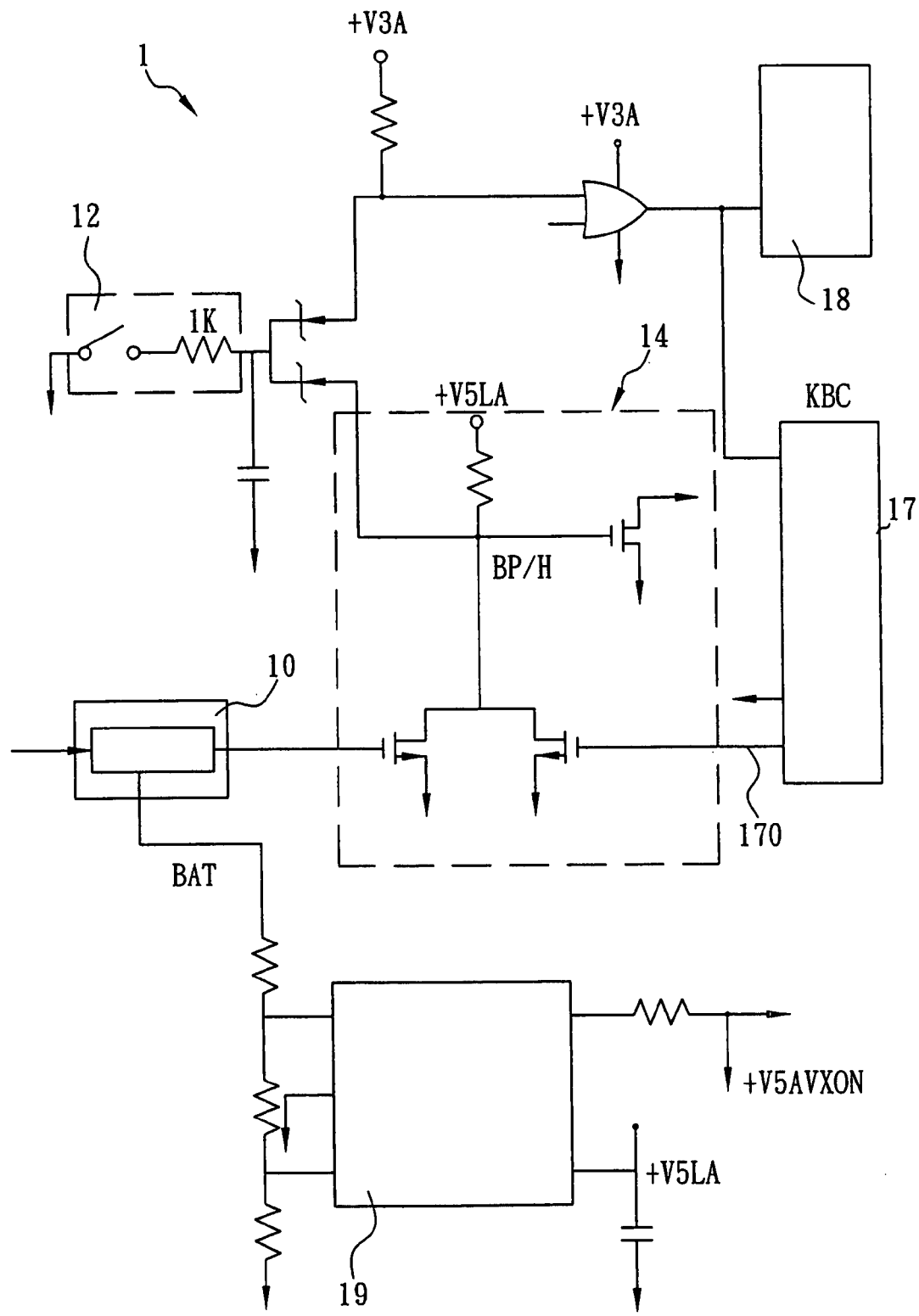
FIG. 2 is a circuit structure in accordance with an embodiment of the present invention.

Referring to FIGS. 1 and 2, in an embodiment of the present invention, the power-saving circuit 1 further includes a control chip 17 electrically coupled to the power switch 12. Upon receiving the start signal from the power switch 12 being operated, the control chip 17 outputs a maintain signal to the power switch 12, which makes the power switch 12 continuously output the second enable signal to the switching module 14. The switching module 14 thus remains closed, allowing the battery voltage to be continuously sent to the voltage conversion module 16 for voltage conversion. When the control chip 17 stops receiving the battery voltage, it ceases outputting the maintain signal to the switching module 14. The switching module 14 is thus switched to an open state to break the connection between the voltage input module 10 and the voltage conversion module 16, so that the battery voltage cannot be sent to the switching module 16. As such, the battery voltage cannot be sent to the portable electronic device before the portable electronic device is powered on or after the portable electronic device is powered off, thus greatly decreasing the speed of battery voltage consumption to achieve the power-saving result.

Referring again to FIGS. 1 and 2, in this embodiment, the control chip 17 includes general purpose I/O pins 170 electrically coupled to the power switch 12 for outputting the maintain signal to maintain the switching module 14 in the closed state so that the battery voltage can be continuously sent to the voltage conversion module 16.

Referring again to FIGS. 1 and 2, in this embodiment, the power-saving circuit 1 further includes a South Bridge chip 18 and a reset chip 19. The South Bridge chip 18 is electrically coupled to the voltage conversion module 16 and the power switch 12 for receiving the working voltage and the start signal, so that the South Bridge chip 18 can be enabled according to the start signal. The reset chip 19 is electrically coupled to the switching module 14 and the voltage input module 10 for receiving the one of the external voltage and the battery voltage and outputting it to the switching module 14. Also, when the reset chip 19 receives the external voltage, it generates a third enable signal and continuously sends the third enable signal to voltage conversion module 16. When the voltage conversion module 16 continuously receives the third enable signal, the external voltage received by the voltage conversion module 16 is continuously converted into the working voltage, and the working voltage is outputted to the South Bridge chip 18.

Referring again to FIGS. 1 and 2, in this embodiment, the control chip 17 may be a keyboard controller (KBC) or a super I/O. The portable electronic device may be a notebook computer.

Figure 3:
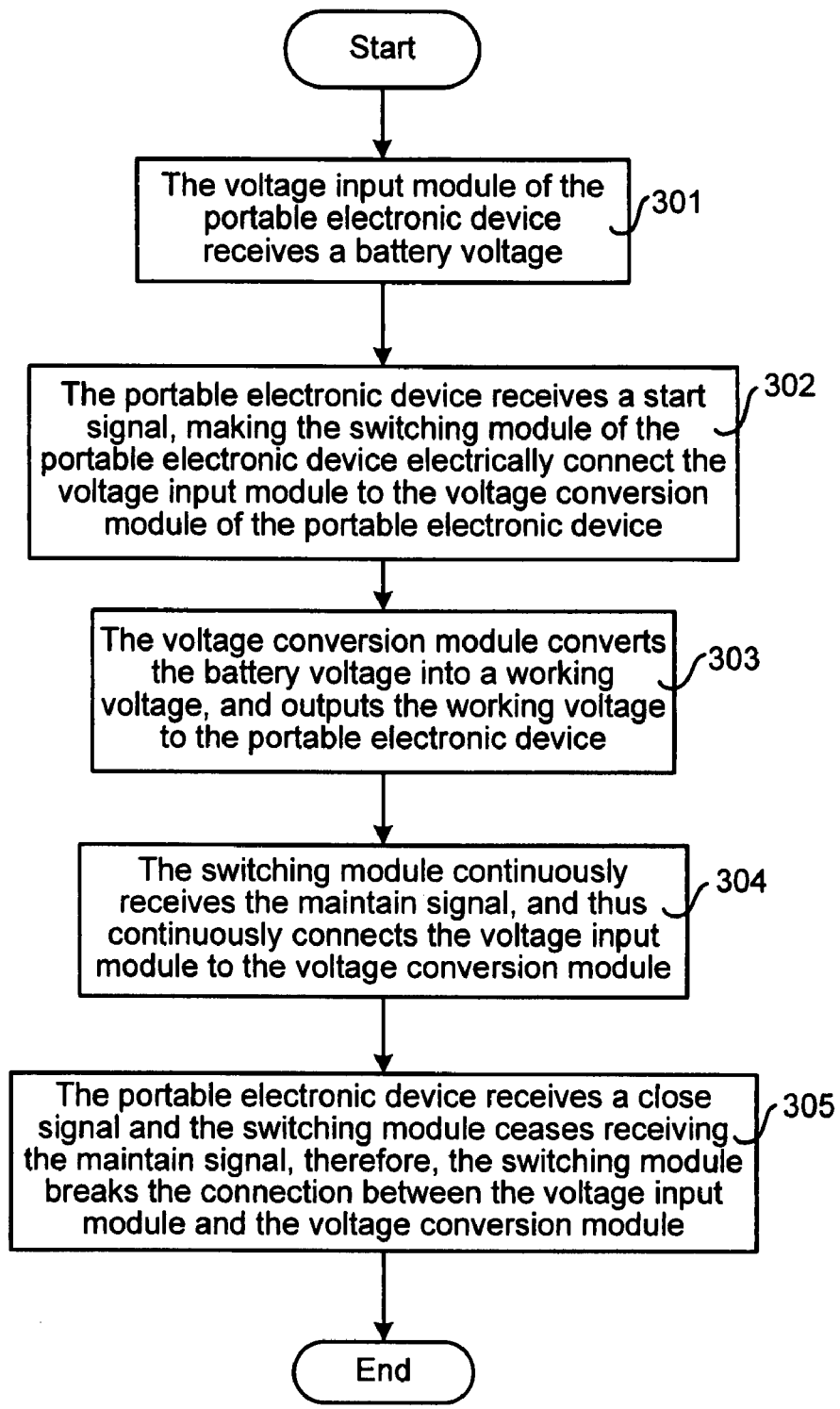
FIG. 3 is a flow chart of a power-saving method in accordance with the present invention.

The present invention also discloses a power-saving method applied in the portable electronic device. Referring to FIG. 3, the power-saving method includes the following steps.

(step 301): The voltage input module 10 of the portable electronic device receives a battery voltage.

(step 302): The portable electronic device receives a start signal, making the switching module 14 of the portable electronic device electrically connect the voltage input module 10 to the voltage conversion module 16 of the portable electronic device. As a result, before the portable electronic device is powered on, the battery voltage cannot be outputted to the portable electronic device to avoid the consumption of battery voltage.

In the present invention, the battery voltage can be an output of the charge storage unit 102 coupled to the voltage input module 10. In addition, when the voltage input module 10 connects with the external unit 100 and receives the external voltage, the switching module 14 directly connects the voltage input module 10 to the voltage conversion module 16, so that the external voltage can be directly sent to the voltage conversion module 16.

(step 303): The voltage conversion module 16 converts the battery voltage into a working voltage, and outputs the working voltage to the portable electronic device, thus supplying the necessary voltage to operate the portable electronic device.

In the present invention, when receiving the external voltage, the voltage conversion module 16 also converts the external voltage into the working voltage and outputs the working voltage to the portable electronic device. As such, both of the converted battery voltage and the external voltage can be applied to the portable electronic device.

(step 304): The switching module 14 continuously receives the maintain signal, and thus continuously connects the voltage input module 10 to the voltage conversion module 16.

In the present invention, the maintain signal can be transmitted to the switching module 14 from the control chip 17. The control chip 17 continuously generates the maintain signal when receiving the start signal, and sends the maintain signal to the switching module 14, making the switching module 14 continuously connect the voltage input module 10 to the voltage conversion module 16.

(step 305): The portable electronic device receives a close signal and the switching module 14 ceases receiving the maintain signal. Therefore, the switching module 14 breaks the connection between the voltage input module 10 and the voltage conversion module 16, so that the battery voltage cannot be outputted to the portable electronic device, resulting in a great reduction of unnecessary consumption.

In summary, by practically measuring the voltage consumption of the portable electronic device, the power-saving circuit and power-saving method of the present invention can achieve the following functions and results:

1. When the portable electronic device uses the battery voltage, by maintaining disconnection between the voltage input module 10 and the voltage conversion module 16, the outputting of battery voltage can be stopped to the portable electronic device, thus greatly reducing battery voltage consumption. Conventional power-saving circuit structure still has a power consumption of 40 mW, while the present invention can reduce the power consumption of the battery voltage to less than 15 mW.

2. The power-saving circuit 1 of the present invention can greatly extend the usage time of the portable electronic device. When the conventional notebook computer is power off, the battery voltage will be consumed after about 30 days. But with the use of the present invention, the battery voltage of the notebook computer will not be exhausted until more than 100 days, thus greatly reducing the power consumption of the battery voltage and charge times of the portable electronic device.

3. The present invention needs only to use a plurality of transistors and resistors to readily achieve the power-saving result. Thus, the present invention not only reduces the cost, but is also easy to be arranged on a circuit board.

4. The present invention can avoid the occurrence of possible unstable operation of the portable electronic device, which is caused by nearly consumed battery voltage, thus ensuring the portable electronic device to be operated with sufficient power.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power-saving circuit applied in a portable electronic device that selectively receives an external voltage or a battery voltage, the power-saving circuit comprising:
   a voltage input module configured to receive and output the external voltage or the battery voltage, and output a first enable signal when receiving the external voltage;
   a power switch configured to output a second enable signal in response to an operation by a user;
   a switching module electrically coupled to the voltage input module and the power switch, and configured to receive the first or second enable signal to determine whether or not to close the switching module;
   a voltage conversion module electrically coupled to the switching module, and configured to receive voltage from the voltage input module when the switching module is closed, convert the voltage received from the switching module into a working voltage, and output the working voltage to the portable electronic device; and
   a control chip electrically coupled to the power switch, and configured to receive the second enable signal and output a maintain signal to the switching module for maintaining the switching module in a closed state.

2. The power-saving circuit in accordance with claim 1, wherein the control chip comprises a general purpose I/O pin electrically coupled to the power switch for outputting the maintain signal.

3. The power-saving circuit in accordance with claim 1, further comprising a South Bridge chip electrically coupled to the voltage conversion module and the power switch for receiving the working voltage and the second enable signal, and a reset chip electrically coupled to the switching module and the voltage input module for receiving the voltage from the voltage input module and outputting the voltage to the switching module, wherein the South Bridge chip is enabled according to the second enable signal.

4. The power-saving circuit in accordance with claim 3, wherein the portable electronic device is a notebook computer.

5. A power-saving method applied in a portable electronic device, the power-saving method comprising:
   outputting a second enable signal to a switching module and a control chip respectively by a power switch when the power switch is pressed by a user;
   outputting a maintain signal to the switching module by the control chip for maintaining the switching module in a closed state after the control chip receives the second enable signal and electrically connecting a voltage input module to a voltage conversion module;
   converting a battery voltage received from the voltage input module into a working voltage and outPutting the working voltage to the portable electronic device by the voltage conversion module; and
   stopping outPutting the maintain signal to the switching module by the control chip for breaking the connection between the voltage input module and the voltage conversion module when the power switch is again pressed by the user.

6. The power-saving method in accordance with claim 5, wherein when the voltage input module receives an external voltage, the method comprises the steps of:
   outputting a first enable signal to the switching module by the voltage input module for switching the switching module into a closed state and electrically connecting the voltage input module to the voltage conversion module; and
   converting the external voltage received from the voltage input module into a working voltage and outputting the working voltage to the portable electronic device by the voltage conversion module.

7. A power-saving circuit applied in a portable electronic device that selectively receives an external voltage and or a battery voltage, the power-saving circuit comprising:
   a voltage input module configured to receive and output the external voltage and or the battery voltage, and output a first enable signal when receiving the external voltage;
   a power switch configured to output a second enable signal in response to an operation by a user;
   a switching module electrically coupled to the voltage input module and the power switch; and
   a voltage conversion module electrically coupled to the switching module, the and configured to receive -voltage from the voltage input module when the switching module is closed, convert the voltage received from the switching module into a working voltage, and output the working voltage to the portable electronic device;
   wherein, when the switching module receives the first enable signal, the switching module is closed and the voltage conversion module outputs the working voltage according to the external voltage and, when the switching module receives the second enable signal and the voltage input module receives the battery voltage, the switching module is closed and the voltage conversion module outputs the working voltage according to the battery voltages;
   the power-saving circuit further comprising a control chip electronically coupled to the power switch, wherein the control chip outputs a maintain signal to the switching module after receiving the second enable signal from the power switch.

8. The power-saving circuit in accordance with claim 7, wherein the control chip comprises a general purpose I/O pin electrically coupled to the power switch for outputting the maintain signal.

9. The power-saving circuit in accordance with claim 7, wherein the maintain signal is configured to maintain the switching module in a closed state.

10. The power-saving circuit in accordance with claim 7, further comprising a South Bridge chip electrically coupled to the voltage conversion module and the power switch for receiving the working voltage and the second enable signal, and a reset chip electrically coupled to the switching module and the voltage input module for receiving the voltage from the voltage input module and outputting the voltage to the switching module, wherein the South Bridge chip is enabled according to the second enable signal.

11. The power-saving circuit in accordance with claim 10, wherein the portable electronic device is a notebook computer.

* * * * *